Dec. 31, 1963 S. B. WELCH 3,116,398
THERMOSTATIC CONTROL SYSTEM WITH THERMAL RELAY MEANS
Filed Feb. 26, 1962 2 Sheets-Sheet 1
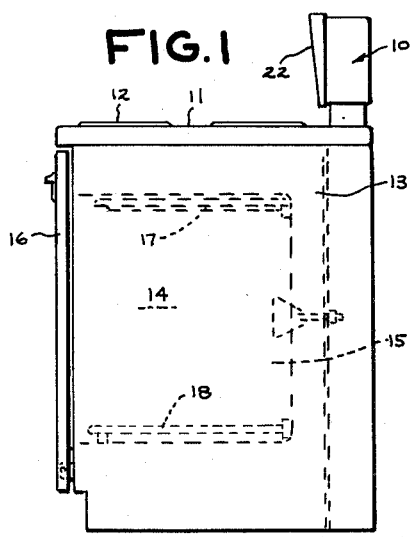
FIG.1
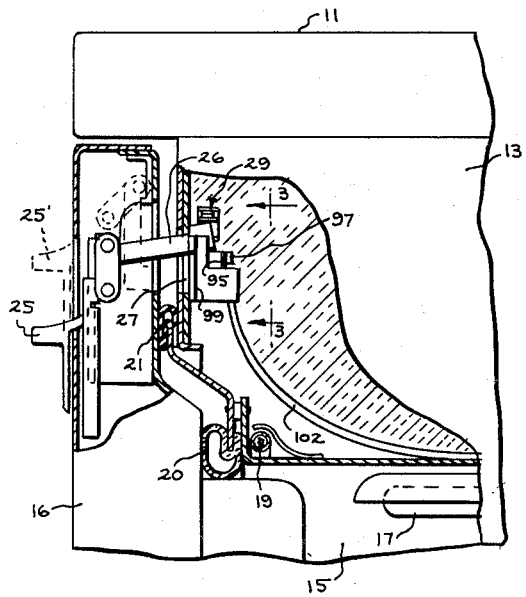
FIG.2
FIG.3
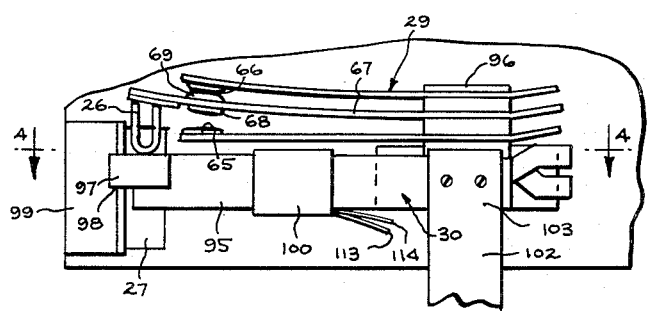
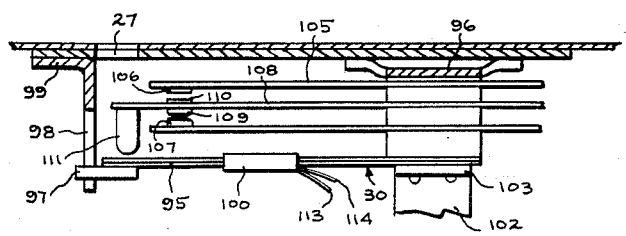
FIG.4
INVENTOR.
STANLEY B. WELCH
BY Richard L. Caslin
HIS ATTORNEY Dec. 31, 1963   S. B. WELCH   3,116,398
THERMOSTATIC CONTROL SYSTEM WITH THERMAL RELAY MEANS
Filed Feb. 26, 1962   2 Sheets-Sheet 2

INVENTOR.
STANLEY B. WELCH
BY Richard L. Caslin
HIS ATTORNEY

United States Patent Office 3,116,398
Patented Dec. 31, 1963

3,116,398
THERMOSTATIC CONTROL SYSTEM WITH THERMAL RELAY MEANS
Stanley B. Welch, Louisville, Ky., assignor to General Electric Company, a corporation of New York
Filed Feb. 26, 1962, Ser. No. 175,493
11 Claims. (Cl. 219—20)

This invention relates to a temperature controlling system and particularly to an electrical thermostatic control system having a single manual control means for shifting the point of control from the normal range of temperatures to a materially higher temperature range.

There is no known reason why the use of this invention should be limited to domestic ovens for use in cooking, although the invention has found its greatest utility in controlling a high temperature oven where the oven is operated at either normal cooking temperatures between about 150° F. and 600° F. or at higher temperatures between about 750° F. and 950° F. for burning off the food soil and grease spatter that accumulates on the walls of the oven liner while food is being cooked within the oven.

Such an oven provided with means for attaining a normal temperature range and a high temperature automatic heat cleaning range is described and claimed in the earlier application of Bohdan Hurko, Serial No. 27,926 which was filed on May 9, 1960 and later abandoned in favor of the continuation-in-part application Serial No. 244,493 which was filed on December 13, 1962, and is likewise assigned to the General Electric Company, assignee of the present invention.

Hydraulic thermostats having an elongated bulb or probe formed on the end of an elongated capillary tube that is joined at its opposite end to a bellows or diaphragm within the thermostat housing have been widely used as oven temperature controlling thermostats for many years. One example of a suitable hydraulic type thermostat is disclosed in the United States Patent to W. J. Ettinger, No. 2,260,014 dated October 21, 1941. The normal oven cooking temperatures have been between about 150° F. and a maximum of about 600° F., and the thermally-responsive fluid used in hydraulic control systems has been able to withstand this degree of temperature without difficulty. However, the known thermally-responsive fluids cannot be operated at temperatures much above 600° F., which renders the hydraulic systems unsatisfactory for use in a high temperature oven unless provisions are made for protecting the thermostat bulb from being exposed to temperatures above 600° F. by suitable metal shields, air curtains, or similar means.

This invention contemplates the provision of an electrical thermostatic control system of the type having a variable-resistance temperature sensor of the type that is quite widely used today for the automatic temperature control of surface heating elements of electric ranges. A thermostatic system of this general type is disclosed in the United States Patent to Harry I. Baker, 2,962,575 which issued on November 29, 1960. Such an electrical thermostatic system as disclosed in the Baker patent is, of course, quite satisfactory for use as an oven thermostat for normal cooking temperatures, but none have been commercially available at a reasonable price that would reach up into the contemplated heat cleaning temperatures between 750° F. and 950° F. and still have the necessary degree of accuracy from the minimum to the maximum temperatures.

The principal object of the present invention is to provide an accurate electric thermostatic control system using alternate relay means where one is used for controlling normal low temperature operations while the other is substituted for high temperature control operations.

A further object of the present invention is to provide an electric thermostatic control system of the class described for a domestic oven where the high temperature operation of the system is, for safety purposes, dependent upon the locking of the oven door.

A still further object of the present invention is to provide modifications of an electric thermostatic control system of the class described where one modification serves to de-energize the system when a predetermined maximum temperature is reached, and the other modification includes a thermal timing device for holding the predetermined maximum temperature for a given time before the circuit is de-energized.

The present invention, in accordance with one form thereof, embodies an electrical thermostatic control system that is adapted to be connected to a source of low voltage, a variable-resistance temperature sensor for sensing the temperature of a body or an enclosure by virtue of being in heat transfer relation therewith, and a manually-settable thermostat that includes a voltage regulating relay so that the senser varies the effective output voltage of the relay in accordance with the sensed temperature regardless of variations in the line voltage. The thermostat also includes a first responder relay that receives the effective output voltage of the voltage regulator. A power relay is controlled by the first responder relay, and this power relay serves as the control means for a source of heat energy such as metal sheathed resistance heating elements. This first responder relay is utilized only for controlling normal cooking temperatures preselectable for example between about 150° F. and 600° F. and to maintain the selected temperature. When it is desired to shift the control point of the circuit from the normal to the high cleaning range, the first responder relay is de-energized and a second responder relay is substituted therefor. The second responder relay permits the temperature of the body or enclosure being controlled to rise to a heat cleaning temperature between about 750° F. and 950° F. When this temperature is reached one modification of this invention will open the second responder relay and retain it open until the thermostatic control system is reset, thereby to shut off the supply of heat. Another modification of this invention will hold the predetermined maximum temperature for a given length of time before the control system is de-energized to shut off the supply of heat. This is provided by a thermal delay and holding means which will allow the second relay means to cycle at a predetermined maximum temperature for a desired length of time before the second relay means is disabled and the power circuit deenergized until the thermostat is reset.

The thermostatic control system of this invention is of primary importance when used in a domestic oven having an automatic high temperature heat cleaning cycle for burning off the food soil from the walls of the oven liner. In this application, suitable interlock switches are combined with the oven door to insure that the high temperature heat cleaning cycle cannot be initiated unless and until the oven door is locked, and the door cannot be opened while the oven temperature remains above a safe temperature for opening the door.

My invention will be better understood from the following description taken in conjunction with the accompanying drawings and its scope will be pointed out in the appended claims.

FIGURE 1 is a right side elevational view of a freestanding electric range embodying the thermostatic control system of the present invention;

FIGURE 2 is a fragmentary side view of the front right side of the oven of FIGURE 1 with parts broken away to show an oven door latching mechanism that is usable with the present invention;

FIGURE 3 is a detail showing in elevation of the door latch interlock switch of the present invention taken on the line 3—3 of FIGURE 2;

FIGURE 4 is a detailed plan view of a door thermostat which cooperates with the oven door latch mechanism so that the latch mechanism may not be opened if the oven temperature is above a safe temperature for opening the door, and this view is taken on the line 4—4 of FIGURE 3;

Figure 5:
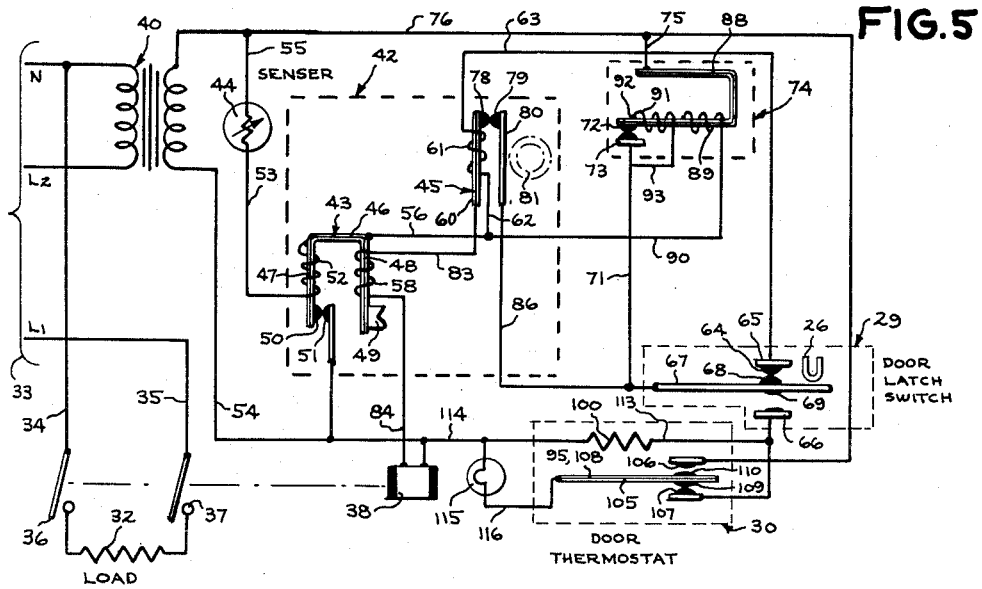
FIGURE 5 is a schematic representation of circuitry embodying the principles of one modification of the present invention.

Turning now to a consideration of the drawings and in particular to FIGURE 1, there is shown an electric range 10 having a top cooking surface 11, with a plurality of surface heating elements 12. The cooking surface 11 is supported on a range body or cabinet structure 13 in which is built an oven 14 that is formed by a box-like oven liner 15 and a front-opening drop door 16. A source of heat energy must be provided for the oven 14, and it is represented by standard resistance heating elements 17 and 18 within the oven, which elements preferably will be of the metallically sheathed type. Heating element 17 is a broil unit arranged adjacent the top wall of the oven liner, while the other heating element 18 is a baking unit supported near the bottom wall of the oven liner. Both of these heating elements 17 and 18 are supported from the back wall of the oven liner 15 and they are connected to lead wires that connect with a source of voltage as will be well understood by those skilled in this art.

It has also been found expedient in a heat cleaning oven to add a third resistance heating element in the form of a mullion heater 19, best shown in FIGURE 2, in the vicinity of the door opening to compensate for heat lost through and around the door 16, as described and claimed in the aforementioned Hurko application. This mullion heater 19 may be a metal-sheathed heating element of a construction similar to elements 17 and 18. It encircles the front opening or collar of the oven liner 15. While the mullion heater is shown as being located externally of the oven liner, it should be appreciated by those skilled in this art that it could be assembled within the throat of the oven liner with a suitable trim member or guard placed thereover.

FIGURE 2 also shows a pair of door gaskets 20 and 21 which encircle the door opening and are sandwiched between the range body 13 and the oven door 16 when the door is closed. The innermost gasket 20 is a woven asbestos member of tubular form, while the other gasket 24 is an extruded silicon rubber gasket as described and claimed in the aforementioned Hurko application. Lastly, the necessary manual controls (not shown) for both the surface heating elements 12 and the oven heating elements 17, 18 and 19 are located in the face of the control panel of a backsplasher 22 which is positioned along the back edge of the cooking surface 11 in a raised position for ready observation and manipulation of the controls as is well understood in this art.

Before turning to a discussion of the circuit diagrams of FIGURES 5 and 6, mention will be made of the fact that the oven door 16 is adapted to be locked in the closed position to insure that the oven cannot be opened when the oven air temperature is above the normal cooking temperatures. Looking at FIGURE 2, the door 16 is shown with a handle 25 which is different from the usual oven door handle in that it is not a stationary member but is movable in a linear direction along the front face of the door from the full line position to the dotted line position identified as 25'. Since the present invention does not necessitate a specific door latch mechanism, this mechanism is only shown diagrammatically and described briefly. The latch mechanism as depicted in the drawings is patterned after the mechanism in a copending application of George A. Scott and Milton S. Williams, Jr., Serial No. 81,371, which is also assigned to the General Electric Company, the assignee of the present invention. It is thought sufficient to mention the following about the door latch. The door latch mechanism is mounted within the interior of the oven door 16. One and preferably two vertically swingable latch members 26 are mounted adjacent slots on the inner side of the door so that when the door handle 25 is depressed the latch members will swing outwardly and engage within a slotted opening or keeper portion 27 in the front of the range body 13. As the handle approaches its fully locked position the latch members 26 are adapted to pull backwardly into the door thereby closing the door 16 tightly against the door gaskets 20 and 21 to provide a dependable sealing means for the door opening.

Cooperating with the latch members 26 is a door latch interlock switch 29 which is best shown in FIGURE 3 and serves as a door interlock means when the oven is to be started on its high temperature heat cleaning cycle so that the cycle cannot begin unless the door is closed and locked shut. A more detailed description of the function of the door latch switch 29 will be given later during the explanation of the circuit diagrams. It is felt best to mention here that cooperating with the door latch switch 29 is a door thermostat 30 shown in FIGURES 3 and 4 whose principal purpose is to prevent the latch member 26 from being unlatched when the oven air temperature is above the normal cooking temperatures of about 600° F. so that the housewife must wait until the temperature has cooled down before the oven door 16 may be opened. The details of the structure of this door thermostat 30 will also be discussed later with reference to the circuit diagrams of FIGURES 5 and 6.

The present invention is concerned with the control of the temperature within the oven cavity 14, and the principles of operation of the first modification can best be understood with reference to the circuit diagram of FIGURE 5. For the sake of simplicity, the oven heating elements 17, 18 and 19 are merely lumped together and designated as the single resistance load 32. This load 32 is connected in a power circuit that includes the standard oven selector switch (not shown) connected to the usual single phase, 236 volt, alternating current, three-wire service entrance 33 that is commonly found in an adequately-wired home. The three wires of the service entrance cable are identified as lines $L_1$ and $L_2$ and neutral wire N, it being understood that there is a potential of approximately 236 volts across lines $L_1$ and $L_2$ and 118 volts across either lines $L_1$ or $L_2$ and the neutral wire N. The oven selector switch (not shown) is usually a multiple pushbutton switch or a rotary switch that is connected between the three-wire power supply and the load to control the amount of power available to the various oven heating elements for conversion to heat energy. The power circuit includes leads 34 and 35 for connecting the load 32 to the source of electrical energy through the selector switch. Interposed in these leads 34 and 35 between the selector switch and the load 32 are the double-pole contacts 36 and 37 respectively of a single-throw power relay 38 which is governed by the control circuit of the present invention. An example of a typical power circuit for an automatic heat cleaning oven is described and claimed in my co-pending application Serial No. 154,776 which was filed on November 24, 1961, and is assigned to the General Electric Company, the assignee of the present invention.

The control circuit is a low voltage circuit having for example a potential of about 12 volts supplied from the secondary of a step-down transformer 40 which has an alternating voltage of about 118 volts applied across the primary winding of the transformer. A component of the present invention is an electric thermostat 42 which may be of the type disclosed in the Baker Patent No. 2,962,575, as was mentioned previously. This type of thermostat has a pulsing thermal relay or voltage regulator 43 that is controlled by a variable-resistance senser 44 and which in turn controls a responder relay 45 that governs the operation of the power relay 38. The senser 44 is preferably a resistor having a high temperature coefficient of resistance, and it is adapted to be located within the oven cavity 14 to detect the oven air temperature therein.

The line voltage of the three-wire source of electrical energy is subject to variations at different periods of time and in different localities. Accordingly, one of the main functions of the pulsing thermal relay 43 is to free the circuit from being voltage sensitive so as to prevent such variations of line voltage from adversely affecting the consistency of operation of the equipment. The voltage regulating relay or voltage regulator 43 is formed as a U-shaped bimetallic or polymetallic blade 46 having a pair of leg portions 47 and 48 that lie substantially in a common plane and extend in spaced parallelism with one another in that plane. The distal end of leg 48 is fixed as at 49, but it is not to be construed as a grounding connection. The distal end of the opposite leg 47 is provided with an electrical contact 50 which is normally engaged with a fixed contact 51. Differential heating of leg portions 47 and 48 is accomplished by heating means in the form of a heater winding 52 coiled around leg portion 47 and electrically connected at one end to this leg. The other end of the winding 52 is series connected with the senser 44 by lead 53. The voltage regulator contacts 50 and 51 are connected back to the secondary of the transformer by lead 54 for connecting the senser 44 and heater winding 52 across the secondary winding of the transformer 40.

The bimetal blade 46 of the voltage regulator 43 is formed of U-shape to permit compensation of ambient temperature variations since the effect upon the position of movable contact 50 upon the heating of leg portion 47 is the opposite of that produced by the heating of leg portion 48. Each time the contacts 50 and 51 of the voltage regulator are closed current flows through the heater winding 52 and through the senser 44. The resultant heating of leg portion 57 causes the contact-carrying end of the leg portion to deflect in a direction to separate contact 50 from contact 51. When these contacts are separated, the energizing circuit for heater winding 52 is interrupted and leg portion 47 commences to cool thereby deflecting in a direction to return contact 50 into re-engagement with contact 51 so as to re-establish the circuit. Leg portion 47 continues to cycle in alternate directions with a small-amplitude motion thereby tending to maintain the effective wattage input to heater winding 52 constant for any given resistance of senser 44. Accordingly, the heater winding 52 will receive energy as a series of pulsations the average or effective voltage of which does not vary as variations occur in the magnitude of the source of voltage. Since the resistance of heater winding 52 is fixed, the effective current through the heater winding and hence through senser 44 will also not vary in magnitude with supply voltage variations. The senser 44 is connected to the secondary of the transformer 40 by means of lead 55, while the output lead of the voltage regulator 43 is lead 56. The effective voltage appearing across transformer lead 55 and the regulator output lead 56 equals the sum of a fixed voltage drop across heater winding 52 and a variable voltage drop across senser 44. The voltage drop across the heater winding is determined by the product of the fixed effective current and of the fixed resistance of heater winding 52, while the voltage drop across the senser is determined by the product of a fixed current and the variable resistance of senser 44. Therefore, the effective output voltage drop from the voltage regulator 43 appearing between output lead 56 and input lead 55 does not vary with changes in the voltage from the three-wire source of voltage, but does vary directly with the resistance of senser 44.

The voltage regulator 43 is also provided with an anticipator winding 58 which is coiled around the leg portion 48 but electrically insulated therefrom. The function of the anticipator winding is to prevent excessive overshoot of the temperature as it approaches the predetermined maximum temperature by reducing the power before the desired temperature is reached. The anticipator winding 58 is connected across the secondary of the transformer in series with the power relay 38 and through the normally-closed contacts 78 and 79 of the responder relay 45 where the circuit branches through either the normally-closed contacts 72, 73 of a second responder relay 74 or through a holding heater 91 of the second responder in a manner to be described hereinafter.

The first responder relay 45 has a bimetallic member 60 that may be of U-shape similar to the bimetal member 46 of the voltage regulator 43. The purpose of the responder 45 is to integrate the pulsations of energy which are applied to it from the voltage regulator 43 so that it responds only to the effective value of the voltage between leads 55 and 56. A heater winding 61 is coiled around the leg portion 60 but electrically insulated therefrom. One end of this heater winding 61 is connected by lead 62 to the output lead 56 of the voltage regulator 43, while the other end of the heater is connected by lead 63 to the normally-closed contacts 65, 68 of the door latch switch 29. The mechanical features of this door latch switch are shown in the elevational view of FIGURE 3. This door latch switch 29 is a single-pole double-throw switch having a pair of fixed contacts 65 and 66 and a centrally located movable arm 67 which is supported at one end in cantilever fashion and has adjacent its opposite end double contacts 68 and 69, one on each side of the member 67 for cooperation with the electrical contacts 65 and 66. For normal cooking operations, the oven door 16 is unlatched and contacts 65 and 68 of the door latch switch are closed. The circuit through the normally-closed contacts 65 and 68 of the door latch switch is by means of lead 71 to the normally closed contacts 72 and 73 of a second responder relay 74 and back to the secondary of the transformer 40 by means of leads 75 and 76. As will be described in greater detail hereinafter, the latching of the door by the latch member 26 causes the contacts 65 and 68 to be separated and closes contact 69 against contact 66.

Referring back to the first responder relay 45, it has normally-closed contacts 78 and 79. Contact 78 is mounted on the distal end of the bimetallic member 60 and is caused to move toward or away from the other contacts 79 depending upon the heat present in the bimetallic member. The other contact 79 is mounted on the distal end of an adjustable blade 80 that is placed in juxtaposition to the bimetal member 60. This adjustable blade 80 has its position determined by a manually adjustable cam member 81 which would be mounted on the shaft of the control handle for the electric thermostat 42. Moreover, the adjustable blade 80 includes a permanent magnet (not shown) as part of the contact 79 to provide a spread of differential between the effective voltage at which the contacts 78 and 79 are brought into engagement and the higher voltage at which these contacts are separated. This feature is not described here in greater detail, but it is disclosed in detail in the aforementioned Baker Patent 2,962,575 to which reference is made. The contacts 78 and 79 of the first responder 45 are connected in series with the anticipator winding 58 of the voltage regulator 43 by means of lead 83. The other side of the circuits of the contacts 78 and 79 of the first responder 45 is connected to the normally-closed contacts 72 and 73 of the second responser relay 74 by means of leads 86 and 71.

The second responder relay 74 has a U-shape bimetal member 88 that is similar in construction to the bimetal member 46 of the voltage regulator 43. As mentioned previously, the second responder relay contacts 72 and 73 are normally-closed during both normal cooking operations and during the build up of temperature during the heat cleaning cycle. Contact 73 is a fixed contact, while contact 72 is mounted on a distal end of a bimetal member 88. When heat builds up in the bimetal member, the bimetal will tend to flex in a direction to open the circuit through the contacts 72 and 73. The second responder 74 includes a heater winding 89 that is connected across the secondary of the transformer 40 by means of lead 90 and 56 joining heater 89 to the output of the voltage regulator 43. The other end of the heater 89 is electrically connected to the bimetal member 88 for effecting a flow of current through the bimetal and then to lead 75 and 76 to the transformer. One other element in the second responder relay 74 is a holding heater 91 of high impedance shunted across the contacts 72 and 73. This heater has one end connected as at 92 to the bimetal member 88, while the other end is connected by lead 93 to the fixed contact 73.

This completes a detailed description of most of the control circuit except for the door thermostat 30, and it will be described here. The primary purpose of the door thermostat is to insure that once the oven air temperature has risen above the normal cooking temperatures of about 600° F., the door cannot be unlatched even though the heat cleaning cycle might have been completed and the power circuit de-energized. Looking first at FIGURES 3 and 4 of the drawing, the door thermostat 30 includes a bimetallic blade 95 which is supported in cantilever fashion adjacent the latch member 26 of the oven door as is best seen in FIGURE 3. When this bimetallic blade 95 is exposed to a temperature in the vicinity of 600° F. and below, it is in a position where it does not interfere with the free swinging movement of the latch member 26. However, when the oven temperature rises above this amount this blade tends to flex in a direction to move beneath the latch member 26 when the door is latched. The bimetallic blade 95 is supported from a mounting bracket 96, and the free end of the blade is provided with an outwardly directed finger 97 which overlies a shelf 98 that is part of a bracket 99 fastened to the oven body 13. This shelf 98 assists in supporting the free end of the blade 95 if an attempt is made to move the latch member 26 when the oven is operated above the normal cooking temperatures.

There is during the initial heat-up of the oven a considerable thermal lag or temperature differential between the bottom of the oven liner 15 and the top wall thereof. To offset this condition, the bimetallic blade 95 is provided with a small resistance thermal latch heater 100 having pig tail leads 113 and 114 for connecting the heater in the heat cleaning circuit as will be described hereinafter. Another feature of this door interlock system is the use of a heat conductor or heat path 102 which is shown in FIGURE 2 in the form of a strip of aluminum that is fastened at its upper end 103 to the mounting bracket 96 while its lower end is fastened to the top wall of the oven liner. This heat conductor 102 renders the bi-metallic blade 95 subject to the residual heat of the oven so that the thermal balance of the bimetallic blade of the heat received from the oven liner and the heat dissipated from the bimetal is such that the thermal interlock remains in the latched position until the oven liner has again reached a safe level for opening the door. It should be understood that the feature of this thermal interlock or door thermostat is not part of the present invention, but it is more fully described and claimed in the co-pending application of George A. Scott, Serial No. 88,526 which was filed on February 10, 1961, and is assigned to the General Electric Company, the assignee of the present invention.

Coupled with the bimetallic member 95 of the door thermostat 30 is a single-pole double-throw switch 105 having a pair of relatively fixed contacts 106 and 107 and a centrally located flexible blade 108 supporting a pair of double contacts 109 and 110. This flexible blade is motivated by the bi-metallic blade 95 through an insulating projection 111 supported on the distal end of the flexible blade 108 and extending into close proximity to th bimetallic blade 95 as seen in FIG. 4. The normal position of the switch 105 is as shown in FIGURE 4 with contacts 107 and 109 closed. It should be appreciated that when the heat cleaning cycle is initiated and the oven air temperature rises the bimetallic blade 95 will move beneath the latch member 26 and in so doing will press against the projection 111 of the flexible blade 108. Hence, the circuit through contacts 107 and 109 is opened and the circuit between contacts 106 and 110 is closed. The purpose of this will be understood with relation to the circuit diagram of FIGURE 5. Since the flexible blade 108 is motivated by the bimetallic blade 95, both of these blades are shown diagrammatically in the circuit diagram as one element which is identified as 95, 108.

The latch interlock heater 100 of the door thermostat 30 is energized only during the heat cleaning cycle by being connected at one end to the normally-open contacts 66 and 69 of the door latch switch by lead 113, while the opposite end of the heater 100 is connected back to the secondary of the transformer by means of leads 114 and 54. An oven pilot light 115, which is energized only during the heat cleaning cycle, is connected to the switch 105 of the door thermostat. When it is energized it gives a visual indication that the oven air temperature is above a safe temperature at which the oven door may be unlatched and opened. As long as the temperature is above the safe temperature for opening the door the bimetallic blade 95 remains under the latch member 26 so that it is impossible to unlatch the door even though the heating elements of the oven are de-energized. When the bimetal blade 95 continues to restrict the unlatching of the latch member 26 it also holds the contacts 106, 110 in the closed position so that the pilot light is energized by being connected across the secondary of the transformer through leads 76, contacts 106 and 110 of the door thermostat switch, through the flexible blade 108 and lead 116 through the pilot light 115 and then back through lead 54 to the transformer.

The present invention may be characterized as dealing with the shifting of the control point of the electric thermostat 42 so that there is in effect two accurate temperature ranges, one covering the normal cooking temperatures between 150° F. and 600° F. and a second range covering the heat cleaning temperatures between about 750° F. and 950° F. The preferred manner in which this shift in the control point of the circuit can be effected is by using an electric thermostat with two alternate responder relays for the control of the power relay in the power circuit.

When the oven is not being operated, the transformer 40 is de-energized and the contacts 78 and 79 of the first responder 45 and the contacts 72 and 73 of the second responder relay are closed, the contacts 65 and 68 of the door latch switch are closed, and the contacts 66 and 69 of the door latch switch are open which is the unlatched position of the door and door latch switch. The door thermostat 30 is closed in the cold position shown in FIGURE 5 with contacts 107 and 109 in normal engagement.

During the several cooking operations such as baking, broiling, and time baking effected by the appropriate operation of the oven selector switch (not shown) and which are operations which occur below the heat cleaning temperature and within a range of temperatures between about 150° F. and 600° F., the contacts 72 and 73 of the second responder relay remain closed thereby connecting the first responder relay 45 across the output of the voltage regulator 43. Accordingly, the contacts 78 and 79 of the first responder relay control the power relay 38 through the anticipator winding 58 of the voltage regulator 43. During these normal cooking operations, the door latch switch contacts 66 and 69 are open so that neither the door latch interlock heater 100 nor the pilot light 115 are energized.

It will be understood that the selected temperatures within the normal operating range (150° F.–600° F.) may be obtained by appropriate adjustment of the cam 81, and that the selected temperature will be maintained rather closely by the functioning of the senser 44 whose effective resistance varies with temperature changes. As temperature of the oven rises above and falls below the desired set temperature, the senser 44 functions to effect the operation of the responder relay 45 to in turn effect the operation of the power relay 38 to open and close the current to the heating load 32 thereby to hold the selected temperature.

To initiate the heating cleaning cycle, it is necessary (1) to actuate the oven selector switch (not shown) to heating energizing position, and (2) to latch the oven door shut. As mentioned previously, the latching of the door causes the latch member 26 to engage the flexible blade 67 of the door latch switch 29 thereby moving it to its opposite position to open contacts 65 and 68 and to close contacts 66 and 69. This disconnects the circuit through the first responder winding 61 so that the contacts 78 and 79 of the first responder remain closed throughout the heat cleaning cycle. The oven is now allowed to heat up to the heat cleaning temperature range as is determined by the second responder relay 74. Once the oven air temperature reaches the predetermined maximum temperature, the contacts 72 and 73 of the second responder relay 74 are separated by the flexing of the bimetal 88 thereby energizing the holding heater 91 to be in series with a parallel circuit that includes the power relay 38 and the latch interlock heater 100. The function of the holding heater 91 is to supply enough heat to the bimetal 88 of the second responder 74 to hold the contacts 72 and 73 separated, thereby de-energizing the power circuit until the setting of the thermostat is changed. The holding heater 91 has a much higher impedance than the relay 38 and the heater 100, for example 100 ohms versus 5 ohms. Accordingly, the power relay and the interlock heater are essentially de-energized so that the oven is allowed to cool down. The heat from the holding heater 91 supplies heat to the bimetal 88 of the second responder and holds the contacts 72 and 73 open until the transformer is de-energized by turning the oven off.

When the door latch 26 is closed to initiate the heat cleaning cycle, the contacts 66 and 69 of the door latch switch 29 are closed so as to energize the interlock heater 100 and the oven pilot light 115. The pilot light 115 is energized through the normally-closed contacts 107 and 109 of the door thermostat as was mentioned previously. When the bimetal 95 reaches a temperature substantially above any temperature obtained in normal baking or broiling operation, the normally-closed contacts 107 and 109 are opened and the contacts 106 and 110 are closed. The result of this is that the pilot light 115 is now energized directly from the transformer. These contacts 106 and 109 remain closed until the oven cools down to a normal temperature say about 500° F. at which time the bimetal member 95 is removed from beneath the latch member 26 and the pilot light 115 is extinguished. This completes the heat cleaning cycle.

It should be noted that this thermostatic control system can be made to shift from normal cooking operations to the heat cleaning operation by merely opening the circuit through the first responder winding 61. If the door thermostat 30 and pilot light 115 are not considered necessary, a simple switch could be used to perform this function. The opening of the first responder winding serves the dual function of shifting the control point of the thermostat as well as protecting the first responder relay from overheating.

Figure 6:
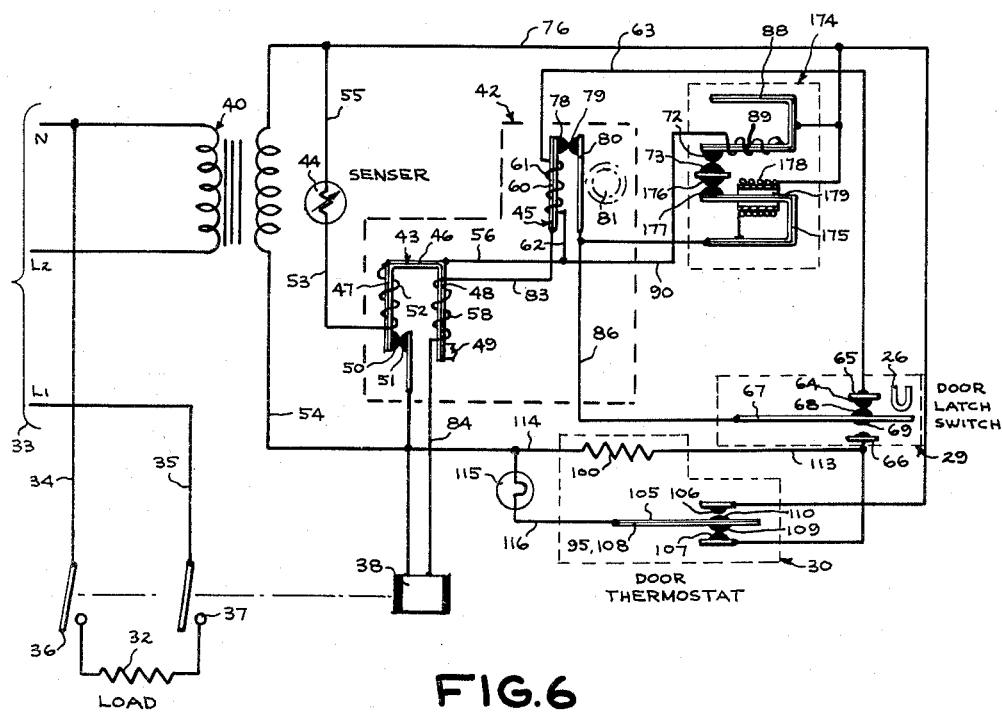
FIGURE 6 is a schematic representation of a second modification of circuitry embodying the principles of the present invention.

Another modification of the present invention is shown in FIGURE 6. Its purpose is to extend the time that the oven remains at the predetermined maximum heat cleaning temperature before the oven is completely de-energized. It will be remembered that the cycle of the first modification of this invention of FIGURE 5 was essentially a "one-shot" operation where the oven temperature was brought up to a pre-determined maximum temperature and then the heating elements were de-energized so that the oven was allowed to cool down. This system works well for normal loads of food soil found on the walls of the oven liner after a single cooking operation but if the food soil were allowed to build up from one use of the oven to the next there might be such a heavy load that all of the food soil would not be burned off during a single heat cleaning cycle. Rather than operate the heat cleaning cycle multiple times by alternately heating and cooling for several cycles it is considered best to extend the time that the oven temperature remains at the predetermined temperature.

Most of the circuit of the second modification of FIGURE 6 is the same as the first modification of FIGURE 5 except that the second responder relay 74 has been modified to the design of second responder relay 174. This new type of responder relay 174 is provided with a thermal delay and holding bimetal 175 which consists of an ambient compensated bimetal having holding contacts 176 and 177 and a thermally-lagged heater 178 that is wound over an aluminum tube that encircles one leg 179 of the bimetal 175. Moreover, the redesigned second responder relay 174 has a U-shaped bimetal 88 similar to that of FIGURE 5 with a holding heater 89 connected by lead 90 to the output lead 56 of the voltage regulator 43. The bimetal 88 also supports the contact 72 for engagement with the fixed contact 73. In other words, change that has been made is to incorporate a pair of normally-closed contacts 176 and 177 in series with the normally-closed contacts 72 and 73 of the second responder relay. Also the holding heater 178 is connected across both the mating contacts 72 and 73 of the second responder relay and the mating contacts 176 and 177 of the thermal delay and holding bimetal 175. This is to be distinguished from the modification of FIGURE 5 where the holding heater 91 is connected across only the second responder relay contacts 72 and 73.

The operation of the circuit in FIGURE 6 during the normal cooking operations is the same as described in the first modification of FIGURE 5. However, when the thermostat 42 is adjusted to the heat cleaning setting and the door latch 26 is closed to place the circuit in the heat cleaning cycle this control system provides an extended time at the maximum cleaning temperature before the oven is completely de-energized. The timing of the period at the heat cleaning temperature is provided by the thermal delay and holding bimetal 175. As the heat cycle is initiated, the opening of door latch switch contacts 65 and 68 disables the first responder relay 45 and energizes the interlock heater 100 and pilot lamp 115 by closing switch contacts 66 and 69. The oven is now under the control of the second responder bimetal 88. When the oven heats to the predetermined maximum heat cleaning temperature of, for example, 900° F., the contacts 72 and 73 of the second responder will cycle open and closed for holding the oven temperature substantially constant. During the periods of time when the oven is de-energized by the second responder relay contacts 72 and 73 being opened, the delay and holding heater is energized in series with the power relay 38 and interlock heater 100. As time progresses the delay heater 178 and tube 179 on which the heater is supported heat up and ultimately cause the holding bimetal 175 to open the contacts 176 and 177. When these contacts open the circuit through the power relay and interlock heater is opened and the holding heater 178 receives enough power to retain the holding contacts 176 and 177 open until the oven is turned off by the selector switch (not shown).

Other modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. An electrical thermostatic control system controlling the temperature of a body provided with electric heating means adapted to be connected with a relatively high voltage source of electrical energy so as to hold selected temperatures in such body within a normal range of operations and to establish in said body an elevated temperature materially above said normal range, comprising a power relay connected to control the energization of said heating means from said high voltage source, a relatively low voltage electrical circuit, a variable resistance temperature senser connected to said low voltage circuit and having a high temperature coefficient of resistance responsive to the temperature of said body to supply from said low voltage source a low voltage which varies as a function of the temperature changes in said body, a pulsing thermal voltage regulating relay having an output voltage and connected to said temperature senser to be controlled thereby so that said output voltage is varied in accordance with variations in the voltage supplied by said senser, a first responder relay connected to be operated in accordance with said output voltage of said pulsing relay and to control the operation of said power relay to operate said heating means to hold a selected temperature in said body within said normal range, means for adjusting the operation of said first responder relay to vary the temperature in said normal range held within said body, a second responder relay to control the operation of said power relay to operate said heating means to hold a temperature in said body materially higher than said normal temperature range, and manually controllable switching means for disconnecting and thereby disabling said first responder relay and for connecting said second responder relay with said pulsing relay and said power relay so as to effect the operation of said heating means to establish said elevated temperature.

2. An electrical thermostatic control system as recited in claim 1 wherein the second responder relay includes a pair of normally-closed electrical contacts in circuit to control said power relay, a bimetallic member controlling the opening and closing of said contacts and in turn placed in operative relation with a heater energized by and when the first responder relay is disabled and the second responder relay is connected with said pulsing relay, and holding heater means of high impedance shunted across the said contacts when the contacts are opened so as to substantially de-energize the second responder relay and hence the heater means in the power circuit so that the temperature is raised to a predetermined maximum temperature and then the power circuit is de-energized until the control system is reset.

3. An electrical thermostatic control system as recited in claim 1 wherein the system is incorporated in a domestic cooking oven which is designed to have an automatic heat cleaning cycle in a temperature range substantially above normal cooking temperatures wherein said first responder controls said heating means to effect said normal cooking temperatures in said oven up to about 600° F., and said second responder when rendered effective controls said heating means to effect in said oven a cleaning temperature falling within the range of 750° F. to 950° F.

4. An electrical thermostatic control system as recited in claim 1 wherein the second responder relay is provided with a thermal delay and holding means so that when a predetermined maximum temperature is reached the said thermal delay and holding means will cause the second responder relay to cycle on and off, the delay and holding means being energized in series with the power relay whenever the second responder relay cycles off until finally the delay and holding means becomes heated to a point where it is disabled thereby causing the second responder relay to open and remain open due to the action of the holding means so as to de-energize the power circuit until the control system is reset.

5. An electrical thermostatic control system for use in a domestic oven as recited in claim 1 wherein the second responder relay is de-energized when the oven temperature reaches a predetermined maximum temperature, and holding heater means combined with the second repsonder relay and connected in series with the power relay when the second responder relay is opened for holding the second responder relay de-energized until the control system is reset.

6. An electrical thermostatic control system for use in a domestic oven as recited in claim 3 wherein the second responder relay is provided with a thermal timing device which functions when the second responder relay is cycled off, as the temperature approaches the predetermined maximum temperature, the energization of the thermal timing device causing its temperature to rise until its temperature reaches a predetermined amount at which point it causes the openings of the circuit to the power relay as well as holding the thermal device in an open circuit position so that the power circuit will remain de-energized until the control system is reset.

7. An electric oven comprising an oven cavity, electric heating elements in heat transmitting relation to the oven cavity and adapted for connection to a source of voltage, selector means for arranging the heating elements in various circuits of different wattages, and a low voltage thermostatic control circuit adapted to be supplied from said source of voltage for controlling the energization of the heating elements, said control circuit comprising a variable resistance temperature senser for sensing the temperature of the oven air, a pulsing voltage regulator in series with the senser so that the senser varies the effective output voltage of the voltage regulator in accordance with the sensed temperature within the oven cavity, a first responder relay receiving the effective output voltage of the voltage regulator, and an output relay controlled by the first responder relay for controlling the energization of the heating elements; the invention comprising a second responder relay for high temperature control, and manual control means for selecting either the first or the second responder relay for the control circuit, the first responder relay controlling said heating means for normal cooking operations up to a maximum of about 600° F. while the alternate use of the second responder relay shifts the control point of the control circuit to control said heating means to attain a heat cleaning temperature between about 750° F. and 950° F.

8. An electric oven as recited in claim 7 wherein the second responder relay includes a pair of normally-closed electrical contacts, the opening and closing of the contacts being controlled by a bimetallic member that is placed in operative relation with a heater winding when the first responder relay is de-energized and the second responder relay is substituted therefor, and holding heater means of high impedance shunted across the said contacts when the contacts are opened, the holding heater serving to open the circuit through the said pair of contacts thereby de-energizing the second responder relay and hence the oven heating elements.

9. An electric oven as recited in claim 8 wherein the said holding heater means is shunted across the pair of normally-closed contacts of the second responder when the contacts are opened, the energization of the holding heater means tending to bias the said bimetallic member into an open circuit position whereby the oven heating elements remain de-energized until the manual control means is reset.

10. An electric oven as recited in claim 8 wherein the holding heater means is part of a thermal delay and holding means comprising an ambient compensated bimetallic member having a pair of holding contacts and a thermally-lagged holding heater, the holding contacts being arranged in series with the normally-closed contacts of the second responder, the holding heater being energized in series with the output relay whenever the contacts of the second responder relay cycle open until finally the said ambient compensated bimetallic member will be heated to open the said holding contacts and retain them in an open position so as to de-energize the oven heating elements until the manual control means is reset.

11. An electric oven as recited in claim 10 wherein the holding heater is wound around a metal tube and the tube encircles one portion of the said ambient compensated bimetallic member.

References Cited in the file of this patent
UNITED STATES PATENTS

| | | |
|---|---|---|
| 2,236,624 | Littwin | Apr. 1, 1941 |
| 2,962,575 | Baker | Nov. 29, 1960 |